(12) United States Patent
Thalange et al.

(10) Patent No.: US 11,563,851 B2
(45) Date of Patent: Jan. 24, 2023

(54) SYSTEM AND METHOD FOR AUTOMATIC MEASUREMENT OF INTERACTIVITY SCORE FOR CUSTOMER-AGENT INTERACTION

(71) Applicant: eGain Communications Corporation, Sunnyvale, CA (US)

(72) Inventors: Varsha Thalange, Sunnyvale, CA (US); Arvind Gopal, Sunnyvale, CA (US)

(73) Assignee: eGain Corporation, Sunnyvale, CA (US)

( * ) Notice: Subject to any disclaimer, the term of this patent is extended or adjusted under 35 U.S.C. 154(b) by 0 days.

(21) Appl. No.: 16/537,354

(22) Filed: Aug. 9, 2019

(65) Prior Publication Data
US 2021/0044699 A1 Feb. 11, 2021

(51) Int. Cl.
*H04M 3/523* (2006.01)
*H04M 3/51* (2006.01)
*G06Q 10/06* (2012.01)
*G06Q 30/00* (2012.01)
*H04L 51/02* (2022.01)

(52) U.S. Cl.
CPC .... *H04M 3/5175* (2013.01); *G06Q 10/06398* (2013.01); *G06Q 10/063112* (2013.01); *G06Q 30/016* (2013.01); *H04M 3/5191* (2013.01); *H04M 3/5233* (2013.01); *H04L 51/02* (2013.01)

(58) Field of Classification Search
None
See application file for complete search history.

(56) References Cited

U.S. PATENT DOCUMENTS

2015/0334233 A1* 11/2015 O'Connor ......... G06F 16/24578
379/265.03

* cited by examiner

*Primary Examiner* — Nafiz E Hoque (57) ABSTRACT

Embodiments of the present invention provide systems and methods for determining an engagement level for a customer-agent interaction (e.g., a phone call, text chat, etc.), and the engagement level can be used to evaluate the performance of the agent. For example, the engagement level can be used to determine or adjust a skill level of the agent, a performance of the communication channel that facilitates the interaction, and/or an optimal workload of the agent. According to some embodiments, the engagement level is used to determine that the agent may be experiencing difficulty satisfying a customer inquiry such that the agent should be assigned resources or assistance.

11 Claims, 8 Drawing Sheets

| Agent 155 | Skill Level 160 | Performance 165 | Struggling 170 | Current Inquiries 175 | Utilization/Agent Score 180 |
|---|---|---|---|---|---|
| Agent 1 | 1 | Underperforming | Yes | Web chat (0.4) SMS (0.3) | 0.7/1.0 |
| Agent 2 | 1 | Overloaded | No | Web chat (0.6) Web chat (0.5) SMS (0.3) | 1.4/1.0 |
| Agent 3 | 2 | Good | No | Phone call (max) | 2.0/2.0 |
| ... | ... | ... | ... | ... | ... |

| Inquiry 650 | Com. Channel 655 | Initial Score 660 | Adjusted Score 665 | Difficulty 670 | Product 675 | Customer 680 | Agent 685 | Agent Interactivity 690 |
|---|---|---|---|---|---|---|---|---|
| 1001 | SMS | 0.4 | 0.3 | Normal | 01 | 1 | 3 | 0.4 |
| 1002 | Email | 0.0 | 0.1 | High | 05 | 4 | 2 | 1.0 |
| 1003 | Web-chat | 0.6 | 0.8 | Normal | 03 | 6 | 2 | 1.0 |
| 1004 | SMS | 0.4 | 0.5 | Normal | 04 | 3 | 1 | 0.4 |
| 1005 | Voice-chat | Max | Max | High | 08 | 9 | 4 | 1.0 |
| ... | ... | ... | ... | ... | ... | ... | ... | ... |

SYSTEM AND METHOD FOR AUTOMATIC MEASUREMENT OF INTERACTIVITY SCORE FOR CUSTOMER-AGENT INTERACTION

CROSS-REFERENCE TO RELATED APPLICATIONS

This application is related to and fully incorporates by reference co-pending patent application, Ser. No. 16/537,338, entitled "SYSTEM AND METHOD FOR AUTOMATIC AGENT ASSISTANCE BASED ON REAL-TIME METRICS," with filing date of Aug. 9, 2019, and hereby incorporated by reference in its entirety.

FIELD

Embodiments of the present invention generally relate to the field of systems and methods related to customer service. More specifically, embodiments of the present invention relate to systems and methods for determining a level of engagement between a service agent and a customer during a customer service session.

BACKGROUND

Traditionally, agents (e.g., customer service agents) receive tasks in a first-come-first-serve basis. However, this approach fails to consider a level of engagement of the agent with a customer or a group of customers and is unable to determine when the agent should be assigned additional tasks. Traditional approaches that do not take into consideration the type of agent-customer engagement also fail to properly assess the workload being performed by an agent. In other words, the traditional approaches often fail to appreciate how hard an agent is actually working. These failures may result in some agents appearing busy, but not working to their potential, or other agents being actually quite busy but still assigned new work. The workloads of the agents are not well-balanced. Moreover, traditional approaches to managing customer service agents are unable to automatically determine if an agent requires assistance on a difficult task, for example. What is needed is a method for providing service to customers that considers real-time metrics when managing agent workloads, assigning tasks to agents, and determining when an agent may require assistance.

SUMMARY OF THE INVENTION

Embodiments of the present invention provide systems and methods for determining an engagement level for a customer-agent interaction (e.g., a phone call, text chat, etc.) during a customer service session, and the engagement level can be used to evaluate the performance and workload of the agent. For example, the engagement level can be used to determine or adjust a skill level of the agent, a performance of the communication channel that facilitates the interaction, and an optimal workload for the agent. According to some embodiments, the engagement level is used to determine that the agent may be experiencing difficulty satisfying a customer inquiry so that the agent can be assigned additional resources or assistance. The engagement level can also be useful in evaluating the actual workload performed by an agent.

According to one embodiment, a method for assigning an inquiry to an agent is disclosed. The method includes receiving the inquiry from a customer over a communication channel, assigning an initial interactivity score to the inquiry based on the communication channel, assigning the inquiry to the agent based on the initial interactivity score and an agent interactivity score, measuring an engagement level between the customer and the agent during a communication session to determine an adjusted interactivity score, and updating the agent interactivity score based on the adjusted interactivity score to generate an updated agent interactivity score.

According to some embodiments, the method includes receiving a second inquiry from a second customer over a second communication channel, assigning a second initial interactivity score to the second inquiry based on the second communication channel, and assigning the second inquiry to the agent based on the second initial interactivity score and the updated agent interactivity score.

According to some embodiments, the updated agent interactivity score includes a sum of interactivity scores assigned to the agent, where the second inquiry is assigned to the agent when a sum of the second initial interactivity score and the updated agent interactivity score is less than a predetermined threshold.

According to some embodiments, the measuring the engagement level between the customer and the agent includes measuring a rate of communication of the customer.

According to some embodiments, the measuring the engagement level between the customer and the agent includes measuring an idle time of the customer.

According to some embodiments, the measuring an engagement level between the customer and the agent to determine an adjusted interactivity level includes measuring a duration of the communication session and comparing the duration to an expected duration associated with the communication channel.

According to some embodiments, the measuring an engagement level between the customer and the agent includes determining that the communication session has ended.

According to some embodiments, the method further includes determining a new initial interactivity level of the communication channel based on the adjusted interactivity level, where the new initial interactivity level is used as the initial interactivity level for subsequent inquiries received over the communication channel.

According to some embodiments, the agent is associated with an agent skill level, and where the assigning the second inquiry to the agent is further based on the agent skill level.

According to some embodiments, the method further includes determining a new agent skill level based on the engagement level, where the new agent skill level is used as the agent skill level for assigning subsequent inquiries to the agent.

According to some embodiments, the assigning the second inquiry is further based on a difficulty levels associated with the inquiry and the second inquiry.

According to another embodiment, a system for assigning an inquiry to an agent is disclosed. The system includes a memory and a processor in communication with the memory and executing an application to perform a method for assigning tasks to agents. The method includes receiving the inquiry from a customer over a communication channel, assigning an initial interactivity score to the inquiry based on the communication channel, assigning the inquiry to the agent based on the initial interactivity score and an agent interactivity score, measuring an engagement level between the customer and the agent during a communication session to determine an adjusted interactivity score, and updating the agent interactivity score based on the adjusted interactivity score to generate an updated agent interactivity score.

According to another embodiment, a non-transitory computer-readable storage medium embodying instructions that, when executed by a processor, cause the processor to perform a method of assigning an inquiry to an agent is disclosed. The method includes receiving the inquiry from a customer over a communication channel, assigning an initial interactivity score to the inquiry based on the communication channel, assigning the inquiry to the agent based on the initial interactivity score and an agent interactivity score, measuring an engagement level between the customer and the agent during a communication session to determine an adjusted interactivity score, and updating the agent interactivity score based on the adjusted interactivity score to generate an updated agent interactivity score.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Portions of the detailed description that follows are presented and discussed in terms of a method. Although steps and sequencing thereof are disclosed in a figure herein (e.g., FIGS. 3 and 4) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "displaying," "writing," "including," "storing," "rating," "transmitting," "traversing," "determining," "identifying," "observing," "adjusting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Automatic Measurement of Interactivity and Engagement Level

Embodiments of the present invention provide systems and methods for automatically determining an engagement level related to a customer service session for a customer-agent interaction (e.g., a phone call, text chat, etc.), and the engagement level can be used to evaluate the performance and/or workload of the agent. For example, the engagement level can be used to determine or adjust a skill level of the agent, a performance of the communication channel that facilitates the interaction, and/or an optimal workload for the agent. According to some embodiments, the engagement level is used to determine that the agent may be experiencing difficulty satisfying a customer inquiry such that the agent should be assigned additional resources or assistance. The engagement level can also be used to assess the performance of an agent.

Figure 1A:
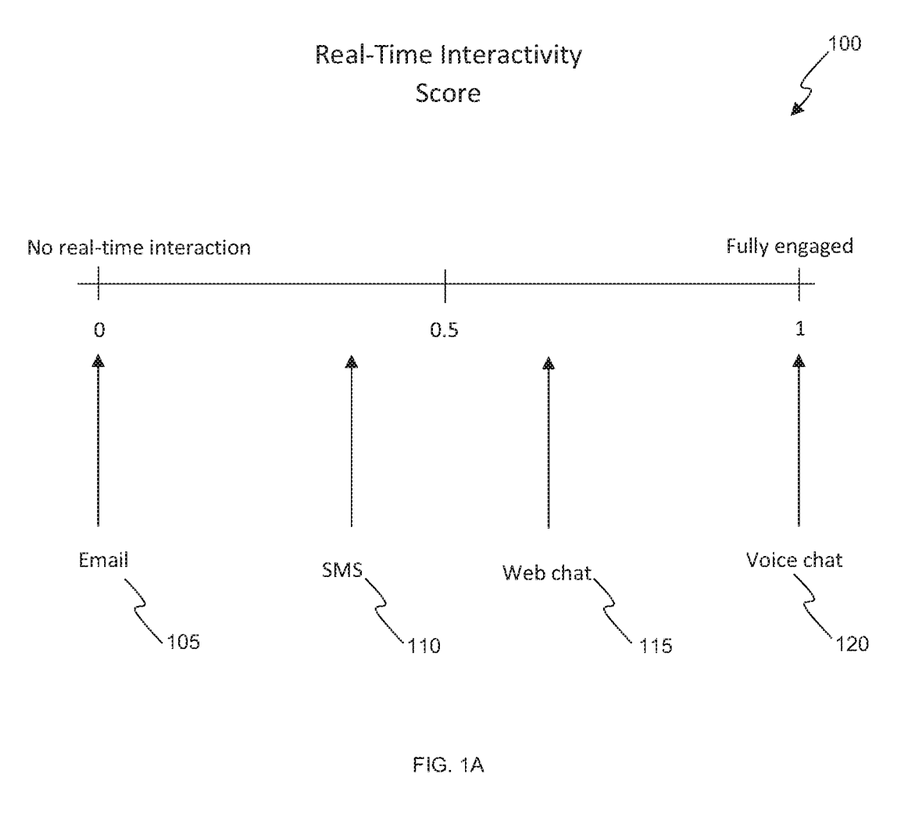
FIG. 1A is a chart of exemplary interactivity scores ranging from 0 to 1 for different communication channels depicted according to embodiments of the present invention.

With regard to FIG. 1A, a chart 100 of exemplary interactivity scores ranging from 0 to 1 for different communication channels is depicted according to embodiments of the present invention. Means of communication are rated along a scale of between 0 and 1 based on the expected rate or level of interaction that can be expected between parties based on the communication channel used. As depicted in FIG. 1A, forms of communication that are not performed in real-time, such as emails, have a low interactivity score, such as 0 or 0.1. On the other end of the scale, real-time voice communications such as voice chat or phone calls between the customer and the agent typically have an interactivity score of 1, or a score that indicates that a typical agent will likely be fully engaged in the customer service session very likely to be and unable to accept additional tasks until the voice communication is complete. Other forms of communication typically fall between 0 and 1 on the interactivity scale, such as SMS messages and web chat, and an agent can handle multiple communication sessions at once as long as the agent's total interactions remain below a predetermined threshold (e.g., 1). According to some embodiments, voice chats and phone calls are considered the highest priority communications channel and are assigned before inquires received over other communication channels when possible. If an agent is handling multiple customer service sessions via one or more different communication channel types, the interactivity scores for each are summed to yield a real-time score for the agent.

Initial interactivity scores may be used for assigning tasks (e.g., customer inquiries) to agents (e.g., customer service agents) and managing workloads and performances of agents. Embodiments of the present invention can assign an initial interactivity score to a communication or inquiry based on the communication type, and the initial interactivity score may be adjusted based on an analysis of the communication session in real-time. For example, an SMS or direct message may initially be assigned an interactivity score of 0.4, and when several messages are received from the customer in a short period of time, the interactivity score applicable to the agent may be raised to 0.5 or 0.6, for example. Similarly, a web-chat may be initially assigned an interactivity score of 0.6 based on the communication type and lowered to 0.4 when the rate of the web-chat is determined to be lower than expected. The initial interactivity scores may be based on the communication channel types, a history of prior communications that involve similar subject matter, a history of prior communications with a similar type of user or product, or a history of prior conversations with the same customer. The initial interactivity scores assigned to various communication channels are adjusted thereafter based on interactions over the communication channels observed in real-time.

Based on initial interactivity scores, inquiries can be assigned to agents according to the skill level of the agent and/or the difficulty of the inquiry in order to optimize the agent's workload. For example, using the interactivity scale depicted in FIG. 1A, an agent will typically only be assigned one voice chat or phone call at a time. An agent of common skill level can typically accept multiple web chats or SMS inquiries at a time. In general, an agent is expected to communicate with a customer at roughly the same rate that the customer is communicating with the agent in order to achieve a satisfactory customer service experience.

According to some embodiments, an agent's ability to interact effectively over specific communication channels is evaluated over time, and their skill level is adjusted accordingly. For example, according to some embodiments, a customer satisfaction rating is provided by customers during or after a communication session, and the agent's skill level is adjusted based on the customer satisfaction rating. Moreover, some embodiments of the present invention measure a number of inquiries satisfied by an agent during a time period and determine the effectiveness (e.g., skill level) of the agent based on the number of inquiries. For example, according to some embodiments, an agent's performance may be considered 'good', 'overloaded', 'underperforming', etc., based on the number of inquiries satisfied during the time period. Communication channels can also be evaluated based on the number of inquiries satisfied over a time period, and the initial interactivity score of the communication channel can be adjusted accordingly. To determine the real-time interactivity score application to an agent, the system sums together all of the interactivity scores of each customer service session in which the agent is simultaneously engaged to determine a current agent interactivity score. Therefore, the agent could be processing two customer service sessions by SMS, one by web chat, and one by phone. The scores of each of these inquiries are summed together to determine the real-time interactivity score of the agent.

Figure 1B:
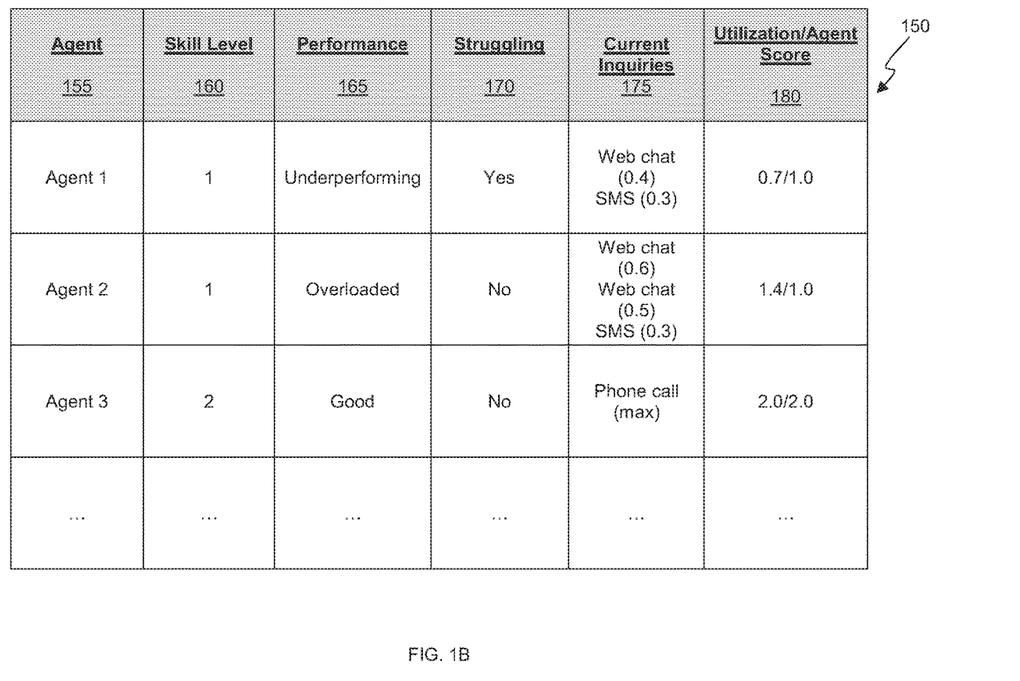
FIG. 1B is an exemplary table for storing agent information depicted according to embodiments of the present invention.

With regard to FIG. 1B, an exemplary table 150 for storing agent information is depicted according to embodiments of the present invention. The table 150 may be stored in an agent database or workload management system of a call center, for example. Agent column 155 stores names or ID numbers of agents working at a call center. The agents are associated with a skill level 160, a performance level 165, a struggling indicator 170, a list of current inquiries 175, and a utilization level 180. Other information associated with agents of the call center, such as an inquiry history, may also be stored in table 150 according to embodiments of the present invention. Agent skill level 160 may be adjusted over time according to the agent's performance level. For example, an agent with a skill level of 1 that is consistently performing well may be assigned a skill level of 2 indicating that the agent is not fully utilized until their total interaction level reaches a score of 2.0. The performance level 165 can be based on the number of inquiries an agent satisfies within a given time period. According to some embodiments, an agent that fails to reach a performance level threshold (e.g., 3 inquiries per hour) is considered to be underperforming. Moreover, an agent that is assigned too many inquiries such that their utilization level is above their maximum utilization may be considered overloaded.

Table 150 can automatically flag agents that are having difficulty with an inquiry using struggling indicator 170. As described herein with regard to FIG. 4, an agent maybe considered to be struggling when an engagement level of an inquiry drops substantially over time, or when a customer remains idle for an extended period of time, for example.

The struggling indicator 170 indicates than an agent should be assigned additional resources or assistance to help satisfy the inquiry.

Current inquiries 175 stores a list of active inquiries that are currently assigned to an agent and the current interactivity score of the inquiry. For example, in table 150 Agent 1 is depicted as being assigned to a web chat having an interactivity score of 0.4 and an SMS inquiry having an interactivity of 0.3. It is to be appreciated that the interactivity scores of each customer service session can change over-time based on real-time metrics, such as the rate of communications received from the customer. The sum of the interactivity scores is 0.7 which is the interactivity score of the agent, which is less than the maximum interactivity score assigned to the agent (1.0). Therefore, the agent is not fully utilized and can accept additional inquiries, and utilization level 180 shows that the agent is currently 70% utilized. Similarly, Agent 2 is depicted as being assigned to web chats having interactivity scores of 0.6 and 0.5, and an SMS inquiry having an interactivity score of 0.3. Therefore, the total interactivity score of the agent is 1.4, which is above the maximum utilization score assigned to the agent (1.0). Therefore, utilization level 180 shows that the agent is 140% utilized, indicating that Agent 2 may be overloaded. Agent 3 is currently assigned to a phone call requiring the full utilization of the agent (2.0).

Figure 1C:
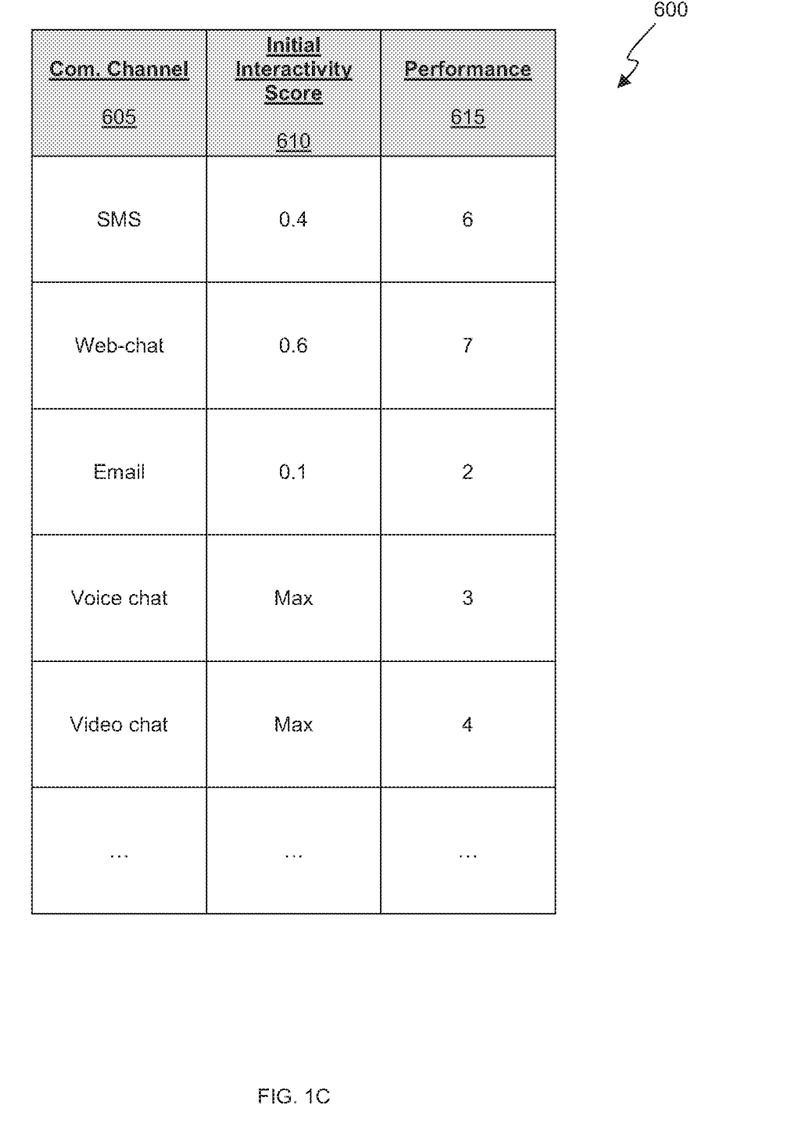
FIG. 1C is an exemplary table for storing a list of communication channels and associated initial interactivity scores and performance levels depicted according to embodiments of the present invention.

With regard to FIG. 1C, an exemplary table 600 for storing a list of communication channels and associated initial interactivity scores and performance levels is depicted according to embodiments of the present invention. The table 600 may be stored in a database or workload management system of a call center, for example. The communication channels 605 are associated with initial interactivity scores 610 based on the type of communication channel (for instance) or the expected level of engagement between the agent and the customer indicating the expected level of interaction between a customer and an agent for discussing an inquiry over the communication channel. The performance level 615 of a communication channel can indicate the rate at which inquiries are satisfied over the communication channel (e.g., 6 inquires per hour). The performance level 615 is modified based on real-time metrics observed during the communication sessions, and the initial interactivity score 610 can be adjusted advantageously based on the observed rate of interaction between the customer and the agent. In this way, inquiries can be assigned to agents based on the initial interactivity score of the communication channel and the current interactivity score of the agent to optimize the workload of the agent and improve efficiency of the call center.

Figure 1D:
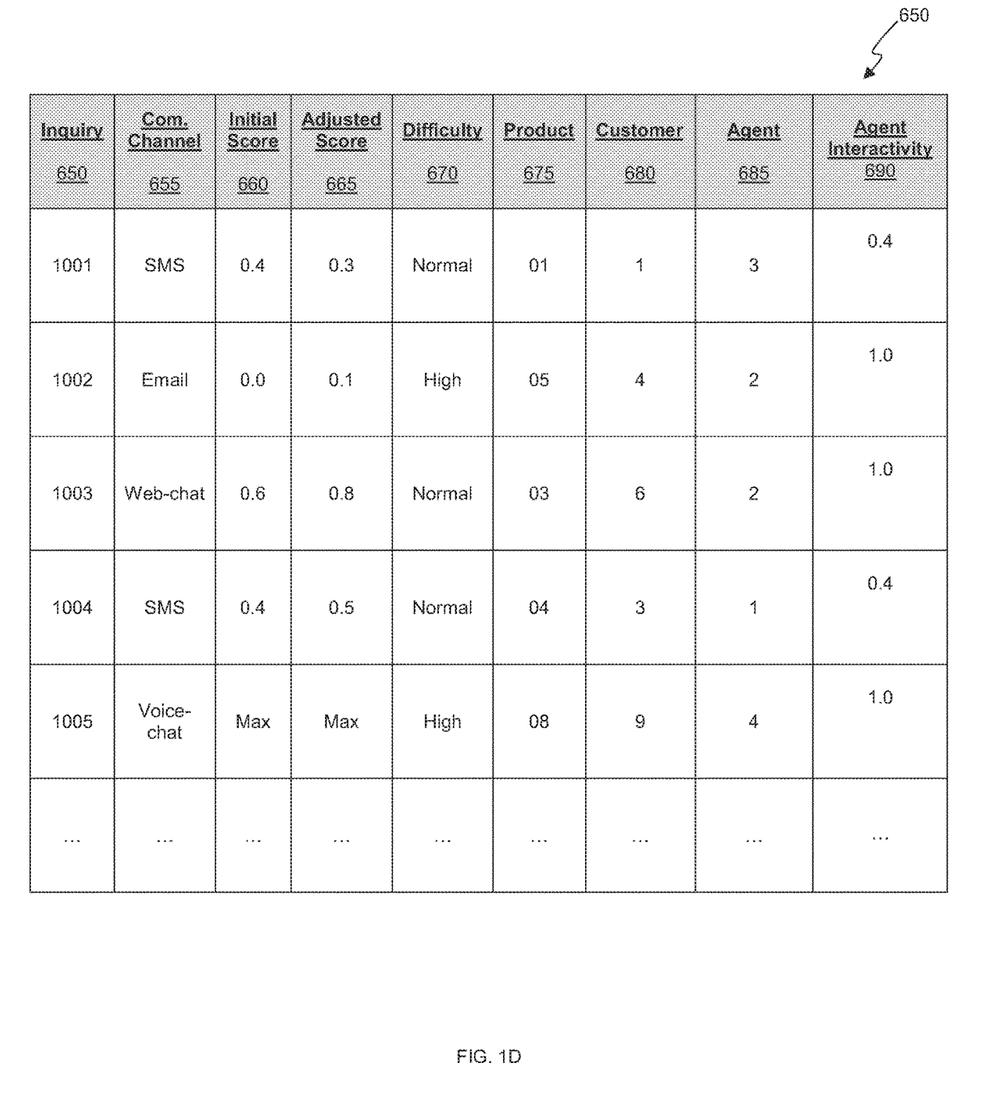
FIG. 1D is an exemplary table for storing a list of inquiries and associated information depicted according to embodiments of the present invention.

With regard to FIG. 1D, an exemplary table 650 for storing a list of inquiries and associated information is depicted according to embodiments of the present invention. The table 650 may be stored in a memory resident computer database or computerized workload management system of a call center, for example. The inquiries 650 can be listed by inquiry number and are received from customers 680 over one or more communication channel types 655. The inquiries 650 are assigned to sessions and an initial interactivity score 660 based on the communication channel type 655. Based on real-time metrics observed during a customer-agent interaction associated with an inquiry, the initial interactivity score of the customer session is adjusted to generate an adjusted interactivity score 665 of the session. The inquiries 650 are also associated with a difficulty level 670 indicating how challenging the inquiry is expected to be in order to solve. Moreover, the inquiries 650 may be associated with a specific product 675 listed by name or product ID, for example. The table 650 also includes names and/or identification numbers of the agent or agents 685 assigned to the inquiries 650, and the table 650 is continuously updated in real-time based to reflect new inquiries and real-time metrics observed during the course of communication between agents and customers. The agent interactivity score 650 indicates the sum of the real-time interactivity levels of all inquiries assigned to the agent associated with an inquiry.

Figure 2:
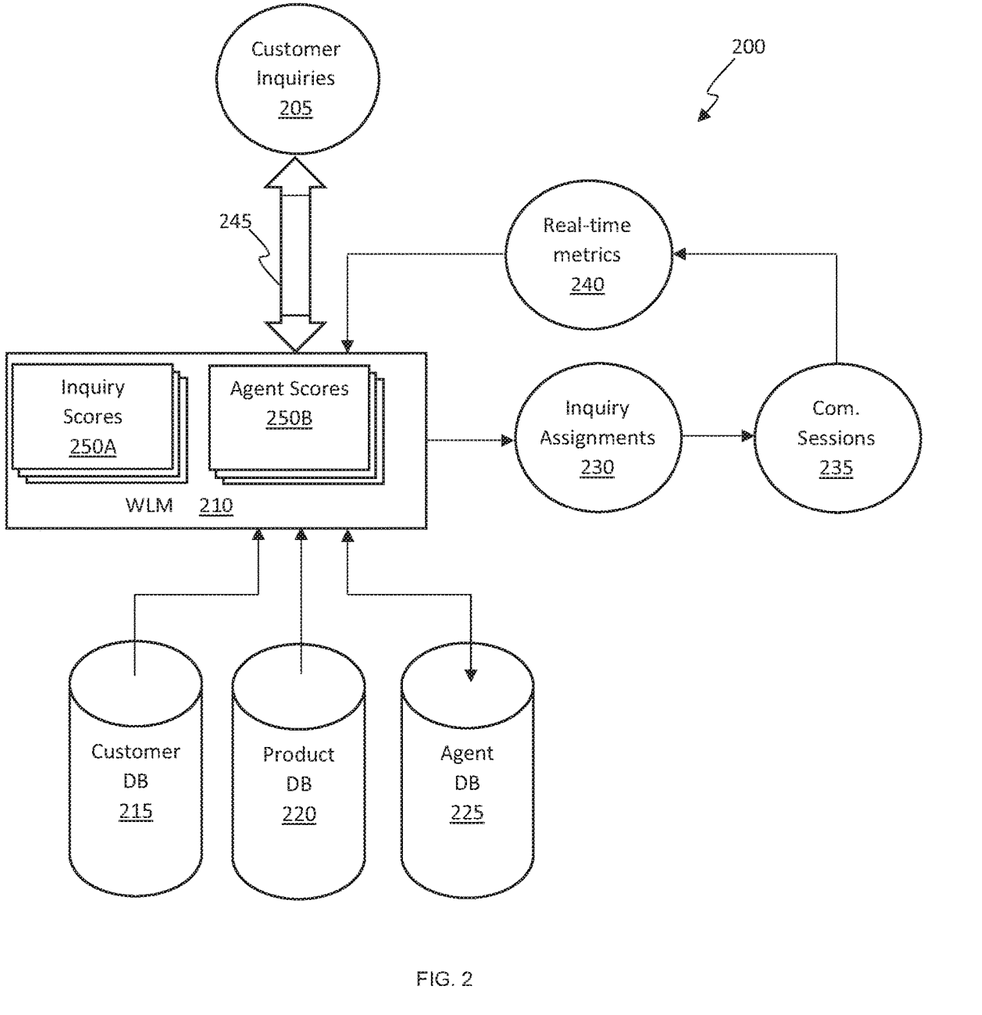
FIG. 2 is a block diagram and data flow diagram of an exemplary computer system for managing a workload of a call center and assigning inquiries to agents based on real-time interactivity scores depicted according to embodiments of the present invention.

With regard to FIG. 2, a block diagram and data flow diagram of an exemplary computer system 200 for managing a workload of a call center and assigning inquiries to agents based on real-time interactivity scores is depicted according to embodiments of the present invention. Customer inquiries 205 are received by a workload management (WLM) system 210 over one or more communication channels 245. According to some embodiments, the customer inquiries 205 are associated with a product, a difficulty level, and a communication channel type over which the inquiry is received and/or responded to.

The WLM system 210 can automatically determine which inquiries should be assigned to which agents to maximize the abilities of the agent and prevent an agent from being overloaded or underutilized. Inquiry interactivity scores 250A and agent interactivity scores 250B are stored and continuously updated by the WLM system according to real-time metrics 240 of observed communication sessions. The inquiry interactivity scores 250A and agent interactivity scores 250B are used to assign inquiries 205 to specific agents, and may be based on the agent's skill level and/or the difficulty of the inquiry. In this way, the WLM system 250 generates inquiry assignments 230 for the inquiries, and communication sessions 235 between agents and customers are monitored to generate real-time metrics 240. The communication sessions may be performed using a messaging app (e.g., SMS, Facebook messenger, WhatsApp, Twitter direct messaging, browser-based chat, etc.), a voice or video communication service (e.g., Facetime, Skype, voice call, etc.), other forms of real-time communication, or communications that do not occur in real-time, such as an email message, a message board or forum post, etc. The real-time metrics 240 may include metrics for determining an engagement level for a specific communication session between a customer and an agent, and inquiry interactivity scores 250A and agent interactivity scores 250B stored by the WLM system 210 can be updated according to the engagement level. For example, an interactivity score 250 may be associated with a specific communication channels or agents, and the scores are continuously updated based on the real-time metrics 240.

Based on the inquiry interactivity scores 250A and the agent interactivity scores 250B, the WLM 210 assigns incoming customer inquiries 205 to agents to generate inquiry assignments 230. For example, an inquiry may be assigned to a specific agent when the agent's current score is low enough to accept the interactivity score associated with the communication type. In one example, an agent with a current agent interactivity score of 0.5 can accept a new inquiry having an interactivity score of 0.4 without becoming overburdened, as the agents total score will remain under a predetermined threshold (e.g., 1.0). The inquiry assignments 230 can be in the form of a table such as table 650 depicted in FIG. 1D. The inquiry assignments 230 assigned to agents result in communication sessions 235 between agents and customers for attempting to solve customer inquiries 205. During the communication session 235, real-time metrics are measured and the inquiry interactivity scores 250A and the agent interactivity scores 250B are adjusted and updated based on the real-time metrics. According to some embodiments, the interactivity scores are associated with specific communication channels or agents. According to some embodiments, the inquiry assignments 230 are generated based on skill levels of the agents and/or difficulty levels associated with specific inquiries, in addition to the inquiry interactivity scores 250A and the agent interactivity scores 250B. The inquiry assignments 230 may be stored in the WLM 210 or agent database 225, for example.

The real-time metrics 240 measured by the computer system 200 can include an engagement level between the agent and a customer (e.g., the rate or cadence of communication during a communication session), a quality or tone of response of the customer, an idle time period during a communication session, and/or the total duration of the communication session, for example. Moreover, according to some embodiments, the metrics 240 can also include events such as a customer prematurely ending a communication session (e.g., before the inquiry is resolved), determining that a customer has sent another inquiry over a different communication channel, and determining that a customer has sent multiple inquiries within a predetermined time period (e.g., 24 hours).

According to some embodiments, the WLM system 210 is in communication with one or more databases, such as a customer database 215, a product database 220, and an agent database 225. The customer database 215 can store a database of customer names or accounts and associated information, such as contact information, addresses, companies, and products registered to the customer, for example. The product database 220 can store a database of products supported by a call center for example, and may include resources for agents to use in providing customer support for the products, such as product manuals, technical guides, etc. The agent database 225 can store a database of agents employed at a call center, for example, and can include agent skill levels, observed performance levels of the agent, and inquiry assignments 230, according to some embodiments.

Figure 3:
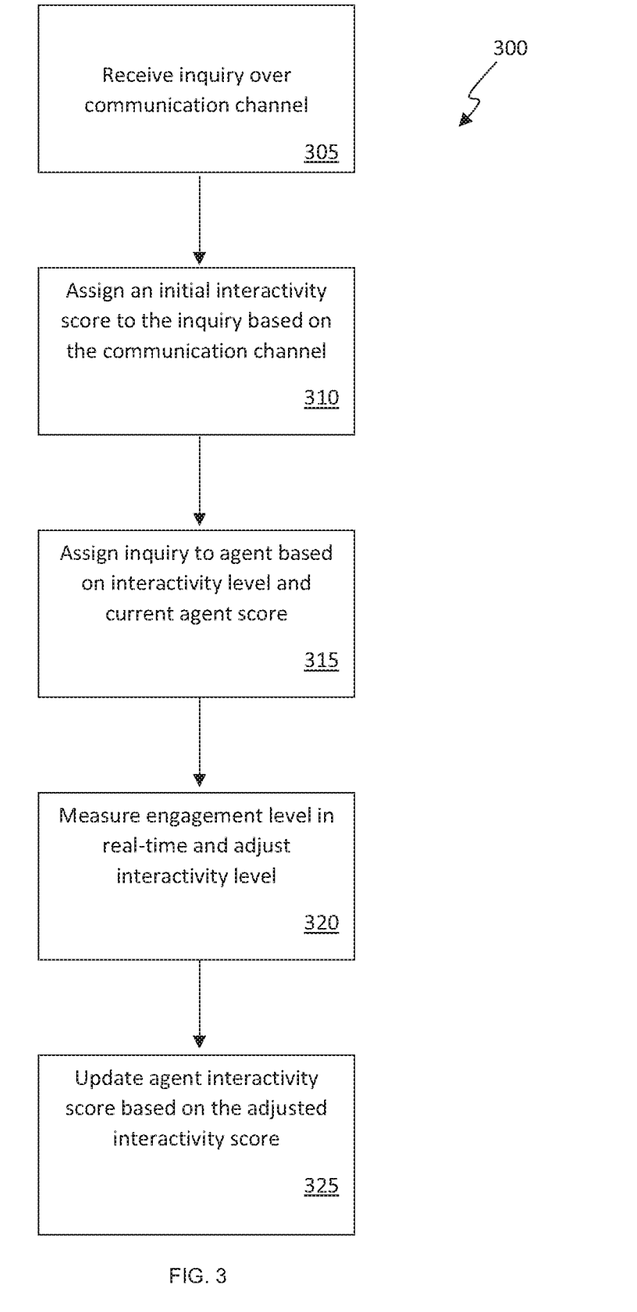
FIG. 3 is a flow chart of an exemplary sequence of computer-implemented steps for automatically assigning inquiries to an agent based on real-time interactivity scores depicted according to embodiments of the present invention.

With regard to FIG. 3, an exemplary sequence of computer-implemented steps 300 for performing a method for automatically assigning an inquiry to an agent based on real-time interactivity scores is depicted according to embodiments of the present invention. At step 305, a customer inquiry is received over a communication channel, such as an email, SMS message, web-chat, or phone call. At step 310, the communication channel over which the inquiry is received is associated with an initial interactivity score, and the initial interactivity score of the communication channel is assigned to the inquiry. At step 315, the inquiry is assigned to a specific agent that can accept the inquiry without becoming overburdened. For example, step 315 can include determining if the sum of the interactivity score associated with the inquiry or communication type and a current interactivity score of the agent is less than a predetermined threshold (e.g., 1). The assignment to the specific agent may be further based on a skill level of the agent and/or a difficulty level associated with the inquiry.

At step 320, the real-time engagement level of the communication between the agent and the customer is measured to adjust the initial interactivity level assigned to the communication session. The real-time engagement level can be determined based on the rate or cadence of communication during a communication session, an idle time period during a communication session, and/or the total duration of the communication session, etc. For example, a customer inquiry sent in an SMS message may initially be assigned an interactivity score of 0.4 and is adjusted to 0.6 when several SMS messages corresponding to the inquiry are received in a short time span (e.g., one minute). At step 325, the agent interactivity score is updated based on the adjusted interactivity score to generate an updated agent interactivity score.

According to some embodiments, when a second customer inquiry is received from a customer over a communication channel, the second customer inquiry is assigned to an agent based on the current interactivity score of the agent (including the adjusted interactivity level of the previous inquiry) and an initial interactivity level of the new inquiry. For example, if the adjusted interactivity level of the previous inquiry is 0.3, the agent's total interactivity score is 0.6, and the initial interactivity level of the new inquiry is 0.3, the agent that was assigned the previous inquiry can automatically be assigned the new inquiry when the sum of the interactivity levels is below a predetermined threshold (e.g., 1). If the sum of the interactivity levels is beyond the threshold, the new inquiry is automatically assigned to a different agent that meets the criteria for accepting the inquiry based on the agent's interactivity score and the initial interactivity score associated with the inquiry.

Figure 4:
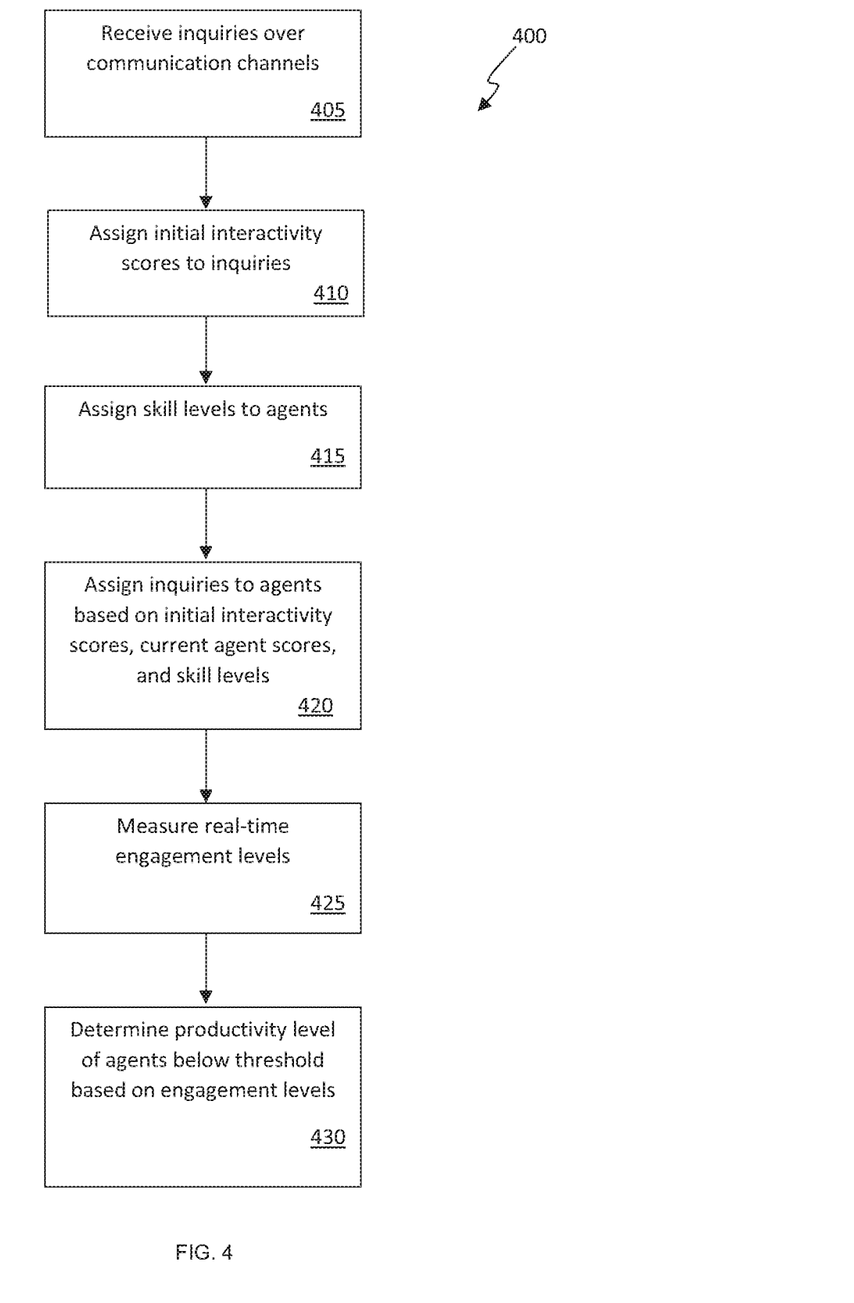
FIG. 4 is a flow chart of an exemplary sequence of computer-implemented steps for automatically managing a workload of a call center depicted according to embodiments of the present invention.

With regard to FIG. 4, an exemplary sequence of computer-implemented steps 400 for automatically managing a workload of a call center is depicted according to embodiments of the present invention. According to some embodiments, the steps 400 include determining that an agent should receive additional resources or assistance for solving a customer inquiry that the agent may be having difficulty with. At step 405, customer inquiries are received over a plurality of communication channels, such as emails, SMS messages, web-chats, or voice calls. At step 410, the communication channels are associated with initial interactivity scores, and the initial interactivity scores are assigned to inquiries based on the communication channel over which the inquiries are received. At step 415, agents are assigned skill levels indicating the amount of real-time interaction the agent is capable of performing. At step 420, the customer inquiries are assigned to the agents based on the initial interactivity scores of the inquiries, the current agent interactivity scores, and the agent skill levels at step 420. The current agent interactivity scores generally represent a sum of the interactivity scores of inquiries already assigned to an agent.

At step 425, engagement levels of the communication sessions between customers and agents are measured in real-time. The real-time engagement levels can be determined based on the rate or cadence of communication during a communication session, an idle time period during a communication session, and/or the total duration of the communication session, for example. At step 430, agents having a productivity level below a threshold are identified based on the engagement levels. For example, according to some embodiments, step 430 can include observing the communication session to detect events such as a customer prematurely ending a communication session (e.g., ending a session before the inquiry is resolved), determining that a customer has sent another inquiry over a different communication channel, and determining that a customer has sent multiple inquiries within a predetermined time period (e.g., 24 hours), and the associated engagement level is adjusted accordingly. The detected events can be used at step 430 to determine that the agent is performing below a performance threshold and that the agent may require additional information or assistance. Moreover, some embodiments of the present invention compare a measured duration of the communication session to an expected duration of the communication session, and determine that the agents requires assistance when the measured duration is significantly longer than the expected duration.

According to some embodiments, step 430 includes assigning information or assistance to help the agent satisfy the customer inquiry, or generating a visual notification that indicates that the agent requires assistance. Conversely, if the agent's performance remains above the performance threshold, the agent may be assigned additional inquiries until the agent is fully utilized (see FIG. 3).

According to some embodiments, a second engagement level for the communication session is calculated and compared to the first engagement level measured in step 425. If the second engagement level is significantly lower than the first engagement level, the agent's performance may be determined to be below a threshold, and additional resources may be assigned to the agent. Moreover, the agent's skill level can be adjusted responsive to determining that the agent's performance is below the predetermined performance threshold.

Exemplary Computer System

Embodiments of the present invention are drawn to computer systems determining customer-agent engagement levels in real-time to manage a workload of a call center. The following discussion describes such exemplary computer systems.

Figure 5:
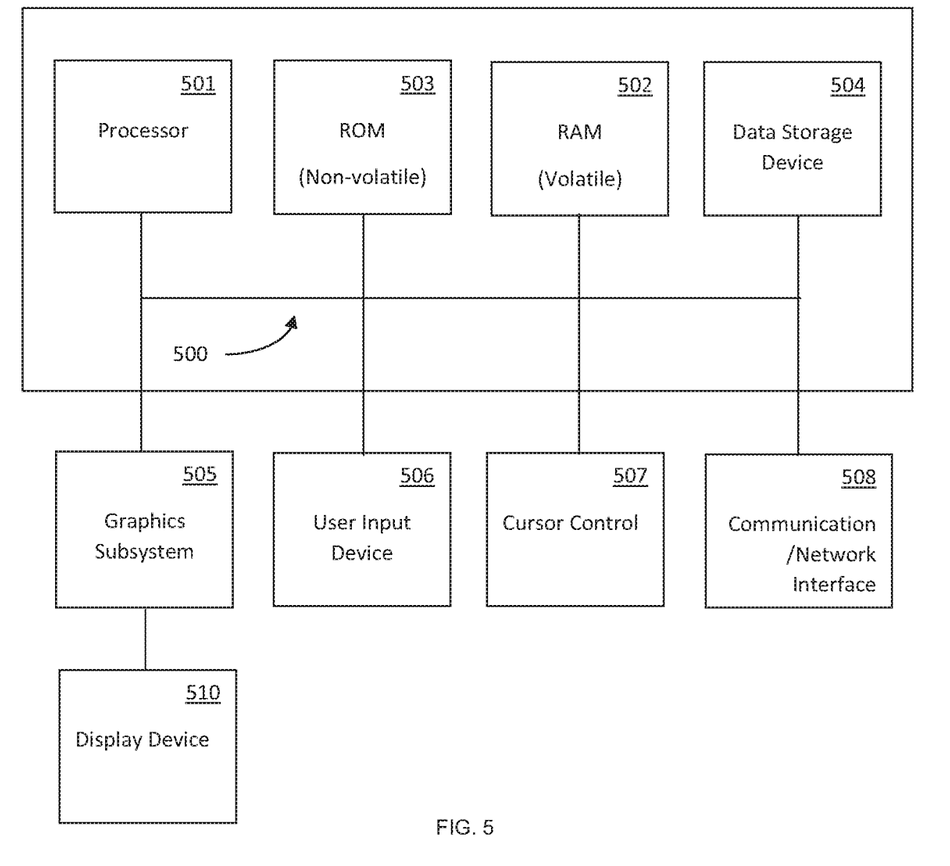
FIG. 5 is a block diagram of an exemplary computer system upon which embodiments of the present invention may be implemented.

In the example of FIG. 5, the exemplary computer system 512 includes a central processing unit (CPU) 501 for running software applications (e.g., a workload management application) and optionally an operating system. Random access memory 502 and read-only memory 503 store applications and data for use by the CPU 501. Data storage device 504 provides non-volatile storage for applications and data and may include fixed disk drives, removable disk drives, flash memory devices, and CD-ROM, DVD-ROM or other optical storage devices. The optional user inputs 506 and 507 comprise devices that communicate inputs from one or more users to the computer system 512 (e.g., mice, joysticks, cameras, touch screens, and/or microphones).

A communication or network interface 508 allows the computer system 512 to communicate with other computer systems, networks, or devices via an electronic communications network, including wired and/or wireless communication and including an Intranet or the Internet. The display device 510 may be any device capable of displaying visual information in response to a signal from the computer system 512 and may include a flat panel touch sensitive display, for example. The components of the computer system 512, including the CPU 501, memory 502/503, data storage 504, user input devices 506, and graphics subsystem 505 may be coupled via one or more data buses 500.

In the embodiment of FIG. 5, a graphics subsystem 505 may be coupled with the data bus and the components of the computer system 512. The graphics system 505 may comprise a physical graphics processing unit (GPU) and graphics/video memory. GPU may include one or more rasterizers, transformation engines, and geometry engines, and generates pixel data from rendering commands to create output images. The physical GPU can be configured as multiple virtual GPUs that may be used in parallel (e.g., concurrently) by a number of applications or processes executing in parallel, or multiple physical GPUs may be used simultaneously. Graphics subsystem 505 can output display data to display device 510.

Embodiments of the present invention are thus described. While the present invention has been described in particular embodiments, it should be appreciated that the present invention should not be construed as limited by such embodiments, but rather construed according to the following claims.

What is claimed is:

1. A method for assigning an inquiry to an agent, said method comprising:
receiving a first inquiry from a customer over a communication channel;
determining an initial interactivity score for the first inquiry specific to the communication channel;
assigning the initial interactivity score to the first inquiry;
assigning the fist inquiry to the agent based on the initial interactivity score, an agent skill level and an agent interactivity score;
measuring an engagement level between the customer and the agent during a communication session to determine an adjusted interactivity score, wherein said measuring the engagement level between the customer and the agent comprises measuring an idle time of the customer;
determining a new agent skill level based on the engagement level, wherein the new agent skill level is used as the agent skill level for assigning subsequent inquiries to the agent;
storing the adjusted interactivity score in a table, wherein the table comprises a list of active inquiries, and wherein the active inquiries comprise: a communication channel; a difficulty level; a total agent interactivity score; and an initial interactivity score;
updating the initial interactivity score stored in the table based on the adjusted interactivity score;
receiving a second inquiry from a second customer over the communication channel;
assigning the updated initial interactivity score specific to the communication channel to the second inquiry; and
assigning the second inquiry to the agent according to the difficulty levels, the total agent interactivity scores, the new agent skill level, and initial interactivity scores stored in the table when the total agent interactivity score is below a predetermined threshold.

2. The method described in claim 1, wherein said measuring the engagement level between the customer and the agent comprises measuring a rate of communication of the customer.

3. The method described in claim 1, wherein said measuring an engagement level between the customer and the agent comprises determining that the communication session has ended.

4. The method described in claim 1, wherein said agent is associated with an agent skill level, and wherein said assigning the first inquiry to the agent is further based on the agent skill level and a difficulty level of the first inquiry.

5. A system for assigning an inquiry to an agent, said system comprising:
a memory; and
a processor in communication with said memory and executing an application to perform a method for assigning an inquiry to the agent, said method comprising:
receiving a first inquiry from a customer over a communication channel;

determining an initial interactivity score for the first inquiry specific to the communication channel;

assigning the initial interactivity score to the first inquiry;

measuring an engagement level between the customer and the agent during a communication session to determine an adjusted interactivity score, wherein said measuring the engagement level between the customer and the agent comprises measuring an idle time of the customer;

determining an agent skill level based on the engagement level, wherein the agent skill level is used for assigning subsequent inquiries to the agent;

storing the adjusted interactivity score in a table, wherein the table comprises a list of active inquiries, and wherein the active inquiries comprise: a communication channel; a difficulty level; a total agent interactivity score; and an initial interactivity score;

updating the initial interactivity score stored in the table based on the adjusted interactivity score;

receiving a second inquiry from a second customer over the communication channel;

assigning the updated initial interactivity score specific to the communication channel to the second inquiry; and assigning the second inquiry to the agent according to the difficulty levels, the total agent interactivity scores, the new agent skill level, and initial interactivity scores stored in the table when the total agent interactivity score of the agent is below a predetermined threshold.

6. A system for assigning an inquiry to an agent as described in claim 5, wherein said measuring the engagement level between the customer and the agent comprises measuring a rate of communication of the customer.

7. A system for assigning an inquiry to an agent as described in claim 5, wherein said measuring an engagement level between the customer and the agent comprises determining that the communication session has ended.

8. A system for assigning an inquiry to an agent as described in claim 5, wherein said agent is associated with an agent skill level, and wherein said assigning the first inquiry to the agent is further based on the agent skill level and a difficulty level of the first inquiry.

9. A non-transitory computer-readable storage medium embodying instructions that, when executed by a processor, cause the processor to perform a method of assigning an inquiry to an agent, said method comprising:

receiving the inquiry from a customer over a communication channel;

determining an initial interactivity score for the inquiry specific to the communication channel;

assigning the initial interactivity score to the inquiry;

measuring an engagement level between the customer and the agent during a communication session to determine an adjusted interactivity score, wherein said measuring the engagement level between the customer and the agent comprises measuring an idle time of the customer;

determining an agent skill level based on the engagement level, wherein the agent skill level is used for assigning subsequent inquiries to the agent storing the adjusted interactivity score in a table, wherein the table comprises a list of active inquiries, and wherein the active inquiries comprise: a communication channel; a difficulty level; a total agent interactivity score; and an initial interactivity score;

updating the initial interactivity score stored in the table based on the adjusted interactivity score;

receiving a second inquiry from a second customer over the communication channel;

assigning the updated initial interactivity score specific to the communication channel to the second inquiry; and assigning the second inquiry to the agent according to the difficulty levels, the total agent interactivity scores, the agent skill level, and initial interactivity scores stored in the table when the total agent interactivity score of the agent is below a predetermined threshold.

10. A method for determining an interactivity score for an agent in a customer service capacity, said method comprising:

receiving a first inquiry from a first customer over a first communication channel;

receiving a second inquiry from a second customer over a second communication channel;

assigning initial interactivity scores to the first and second inquiries based on the communication types of the first and second communication channels;

assigning the first and second inquiries to the agent based on the initial interactivity scores and an agent interactivity score;

updating said agent interactivity score based on said initial interactivity scores to produce an updated agent interactivity score;

measuring engagement levels between the first and second customers and the agent during communication sessions therebetween to determine adjusted interactivity scores of said inquiries, wherein said measuring the engagement level between the customer and the agent comprises measuring an idle time of the customer;

determining an agent skill level based on the engagement level, wherein the agent skill level is used for assigning subsequent inquiries to the agent;

storing the adjusted interactivity scores in a table, wherein the table comprises a list of active inquiries, and wherein the active inquiries comprise: a communication channel; a difficulty level; a total agent interactivity score; and an initial interactivity score;

updating the updated agent interactivity score based on the adjusted interactivity scores to generate a second updated agent interactivity score receiving a third inquiry from a third customer over a third communication channel;

assigning an initial interactivity score to the third inquiry based on the communication type of the third communication channel; and assigning the third inquiry to the agent according to the difficulty levels, the total agent interactivity scores, the agent skill level, and initial interactivity scores stored in the table when the total agent interactivity score is below a predetermined threshold.

11. A method as described in claim 10 further comprising:

measuring engagement levels between the third customer and the agent during a communication session therebetween to determine an adjusted interactivity score of said third inquiry; and updating the third updated agent interactivity score based on the adjusted interactivity score of the third inquiry.

* * * * *